United States Patent
Kim et al.

(10) Patent No.: US 10,298,492 B2
(45) Date of Patent: May 21, 2019

(54) SYSTEM AND METHOD FOR INTERWORKING BETWEEN VEHICLE CONTROLLER AND EXTERNAL RESOURCE

(71) Applicant: HYUNDAI MOTOR COMPANY, Seoul (KR)

(72) Inventors: Chul Min Kim, Yongin-si (KR); Si Jun Kim, Seoul (KR); Dong Youl Lee, Yongin-si (KR); Young Su Kim, Yongin-si (KR); Jin Kim, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 472 days.

(21) Appl. No.: 14/942,847

(22) Filed: Nov. 16, 2015

(65) Prior Publication Data
US 2017/0043731 A1 Feb. 16, 2017

(30) Foreign Application Priority Data

Aug. 12, 2015 (KR) .................. 10-2015-0114023

(51) Int. Cl.
*H04L 12/721* (2013.01)
*G07C 5/00* (2006.01)
*H04L 29/08* (2006.01)
*B60W 50/00* (2006.01)
*H04L 29/06* (2006.01)

(52) U.S. Cl.
CPC ............. *H04L 45/72* (2013.01); *B60W 50/00* (2013.01); *G07C 5/008* (2013.01); *H04L 67/12* (2013.01); *H04L 69/08* (2013.01)

(58) Field of Classification Search
CPC ....... H04L 445/72; H04L 67/12; H04L 69/08; B60W 50/00; G07C 5/008
See application file for complete search history.

(56) References Cited

U.S. PATENT DOCUMENTS

| | | | |
|---|---|---|---|
| 2009/0077240 A1* | 3/2009 | Alrabady | H04L 67/06 709/227 |
| 2011/0144858 A1 | 6/2011 | Yun et al. | |
| 2012/0140752 A1 | 6/2012 | Yun et al. | |
| 2014/0207535 A1* | 7/2014 | Stefan | G05D 1/0022 705/7.42 |

(Continued)

FOREIGN PATENT DOCUMENTS

| | | |
|---|---|---|
| JP | 2010-206697 A | 9/2010 |
| KR | 10-2007-0013129 A | 1/2007 |

(Continued)

*Primary Examiner* — Siming Liu
(74) *Attorney, Agent, or Firm* — Morgan, Lewis & Bockius LLP (57) ABSTRACT

A system for interworking between a vehicle controller and an external resource includes at least one vehicle controller installed in a vehicle and configured to control an operation of the vehicle. At least one external device provides processing information of the external resource upon a request of the vehicle controller. A vehicle mobile gateway is connected to the vehicle controller via an in-vehicle network and connected to the external device via an external network of the vehicle to interface so that the vehicle controller and the external device may communicate with each other.

20 Claims, 10 Drawing Sheets

(56) References Cited

U.S. PATENT DOCUMENTS

2014/0207707 A1    7/2014  Na et al.
2015/0043594 A1*   2/2015  Kim ........................ H04L 45/42
                                                            370/422

FOREIGN PATENT DOCUMENTS

| KR | 10-2009-0022038 A | 3/2009 |
| KR | 10-2010-0000823 A | 1/2010 |
| KR | 10-2010-0023509 A | 3/2010 |
| KR | 10-2012-0062089 A | 6/2012 |
| KR | 10-2014-0093477 A | 7/2014 |

* cited by examiner

SYSTEM AND METHOD FOR INTERWORKING BETWEEN VEHICLE CONTROLLER AND EXTERNAL RESOURCE

CROSS-REFERENCE TO RELATED APPLICATION

This application claims the benefit of priority to Korean Patent Application No. 10-2015-0114023, filed on Aug. 12, 2015 in the Korean Intellectual Property Office, the disclosure of which is incorporated herein in its entirety by reference.

TECHNICAL FIELD

The present disclosure relates to a system and a method for interworking between a vehicle controller and an external resource, which provide a vehicle-oriented interface environment so that the vehicle controller may utilize the external resource of an external device.

BACKGROUND

Due to rapid development in the automobile industry in recent years, mechanical components for vehicles have been developed dramatically, which has forced development in electric/electronic technology. For example, information technology (IT) has been considered to be a critical technology in implementing vehicle control even though it does not directly affect a vehicle control. Currently, infotainment (a compound word of information and entertainment) based on audio video navigation telematics (AVNT) has been applied. Accordingly, various attempts in IT application for vehicles have been made to achieve an advanced vehicle control through cooperation between automakers and IT companies. As an example, self-driving technology and various vehicle applications utilizing mobile devices have been developed. However, IT devices cannot be simply applied to a vehicle in a single unit or in a conventional controller, and thus, a regular vehicle to device (V2D) technology may be utilized to apply various applications through communication with the vehicle.

The current V2D technology for interworking between the vehicle and the IT device has been relied on an IT company, and therefore, the current V2D technology is configured based on only the IT device in which the vehicle is treated as a node. That is, a technology, which collects and handles (analyze, process, and remotely communicate) data of the vehicle based on the IT device such as OpenXC, utilizes a screen of the IT device and multimedia resources in the vehicle such as MirrorLink, or displays a screen of the vehicle in the screen of the IT device has been introduced. Such an application uses a user experience (UX) method in which a user can analyze the vehicle by utilizing the IT device, however, IT technology is not maximally utilized in enhancing vehicle control performance.

As described above, the conventional method for interworking between the vehicle and IT technology includes a method of embedding an IT device in a vehicle in the form of a single item. This method may increase cost and weight of the vehicle, and there is a limit in utilization and performance due to mounting limitation of the IT device in the vehicle. For example, if the IT device that performs health care and biometrics function is mounted in the vehicle, it is impossible to know a previous state of a driver before the driver gets in the vehicle because the corresponding function can be used only when the driver is in the vehicle.

Another conventional method for interworking between the vehicle and IT technology collects and utilizes information (data) of a vehicle by interworking between an IT device present outside the vehicle and a single controller within the vehicle. This method enables a function of manipulating multimedia and other comfort systems inside the vehicle, or uses a new function of the IT device in the vehicle. However, this second method also uses the UX oriented approaching method, and thus, it only controls entertainment or information providing level function. Therefore, in order to upgrade the vehicle control function using IT technologies, there exists a need to utilize external resources for a vehicle control.

SUMMARY

The present disclosure has been made in view of the above problems, and provides a system and a method for interworking between a vehicle controller and an external resource so that the vehicle controller may utilize the external resource of an external device necessary for a vehicle control.

In accordance with an embodiment of the present inventive concept, a system for interworking between a vehicle controller and an external resource includes at least one vehicle controller installed in a vehicle and configured to control an operation of the vehicle. At least one external device provides processing information of the external resource upon a request of the vehicle controller. An automotive mobile gateway (AMG) is connected to the vehicle controller via an in-vehicle network and is connected to the external device via an external network of the vehicle to interface so that the vehicle controller and the external device may communicate with each other.

The vehicle controller may comprise an API generator having an application program interface (API) set to utilize the information provided by the external device in a vehicle control. An API transmitter is configured to request information necessary for the vehicle control or transmit vehicle data according to an API called from the API set. An external information receiver is configured to return the processing information of the external device included in a message received via the in-vehicle network to the vehicle controller. A first communicator is configured to connect the vehicle controller to the in-vehicle network.

The API transmitter may include an API analyzer configured to examine validity and consistency of the called API. A message generator is configured to generate an in-vehicle network message corresponding to the API which passed the examination of the validity and the consistency.

The message generator may generate at least one in-vehicle network message with respect to a single API.

The message generator may analyze syntax of the API which passed the examination, and generate the in-vehicle network message from the analyzed API based on a generation rule.

The in-vehicle network message may include a header field, a payload field, and a trailer field.

The header field may include information such as a source, a destination, a message type, an API function ID, a node, a total API size, a start sign or end sign of the API, and an index.

The payload field may include a parameter flag, a parameter size, and parameter data.

The external information receiver may include an external information analyzer configured to analyze a message received through the first communicator and to extract the processing information of the external device. An API response generator is configured to check stability in case of applying the processing information extracted from the external information analyzer, and generate an API response based on a result of checking.

The API response generator may generate the API response by using the processing information of the external device and in-vehicle data, when there is no irregularity in the stability.

The AMG may include an exterior interworking API processor configured to perform a protocol conversion from an in-vehicle network message to a vehicle exterior network message. An exterior calculation result processor may convert the vehicle exterior network message into the in-vehicle network message.

The external device is an information communication device that provides resource.

The resource includes an infrastructure around the vehicle, a camera embedded in a portable device, a global positioning system (GPS), a gyroscope, various sensors such as an accelerometer, and includes a function of a wearable device such as biometric recognition, healthcare, and a condition determination.

The external device includes a database (DB) which accumulates and manages information on a condition of a driver before the driver enters the vehicle.

In accordance with another embodiment of the present inventive concept, a method for interworking between a vehicle controller and an external resource includes requesting, by a vehicle controller, the use of resource of an external device through an AMG. The request of the vehicle controller is sent to the external device by the AMG. Processing information is transmitted, according to the request of the vehicle controller, to the vehicle controller through the AMG by the external device.

BRIEF DESCRIPTION OF THE DRAWINGS

The objects, features, and advantages of the present disclosure will be more apparent from the following detailed description in conjunction with the accompanying drawings.

DETAILED DESCRIPTION

Exemplary embodiments of the present inventive concept are described with reference to the accompanying drawings in detail. The same reference numbers are used throughout the drawings to refer to the same or like parts. Detailed descriptions of well-known functions and structures incorporated herein may be omitted to avoid obscuring the subject matter of the present disclosure.

The present disclosure suggests an interface technology of a gateway type, which enables interwork a vehicle controller with a resource (external resource) of an external device based on a vehicle.

Figure 1:
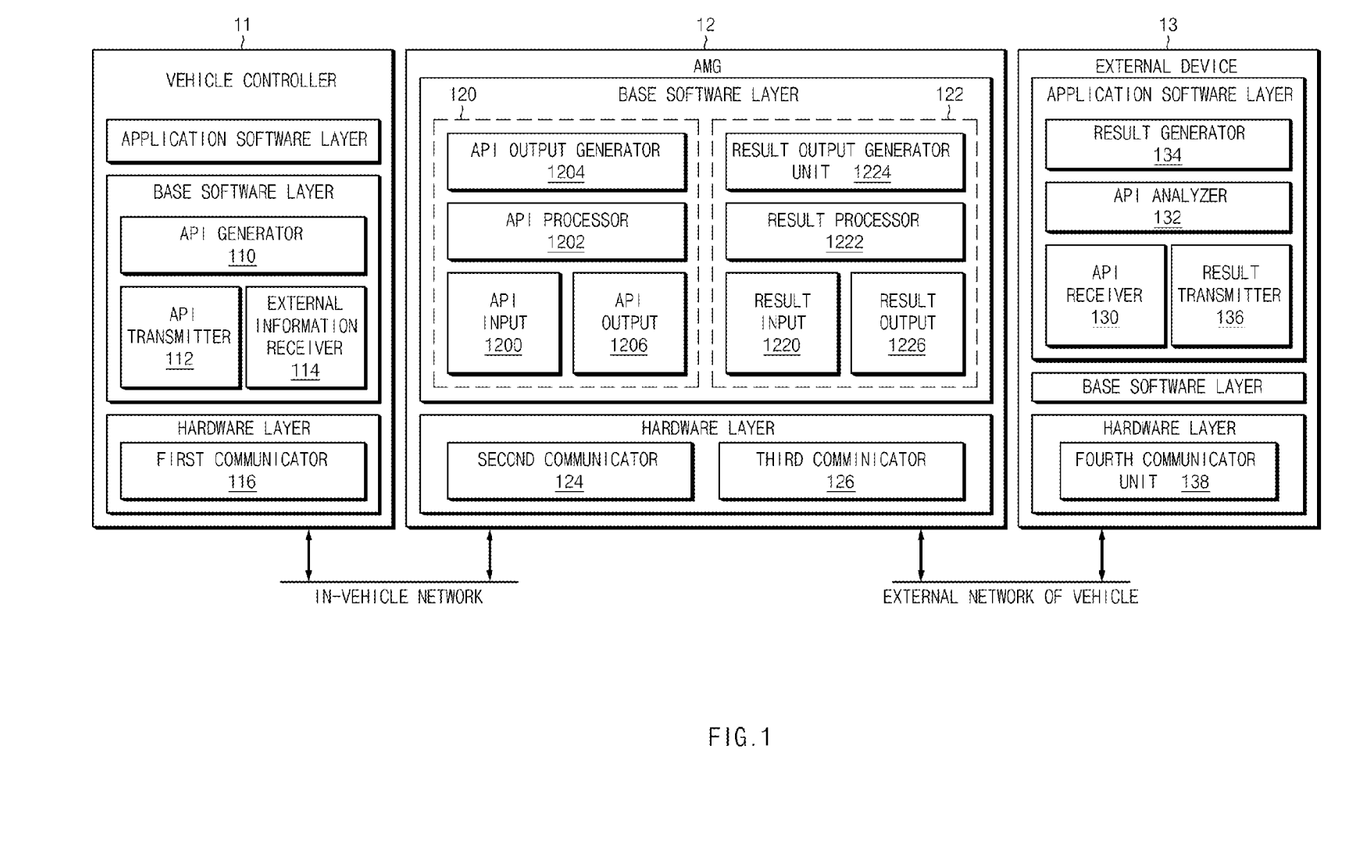
FIG. 1 is a block diagram illustrating a system for interworking between a vehicle controller and an external resource according to an embodiment of the present inventive concept.
Figure 2:
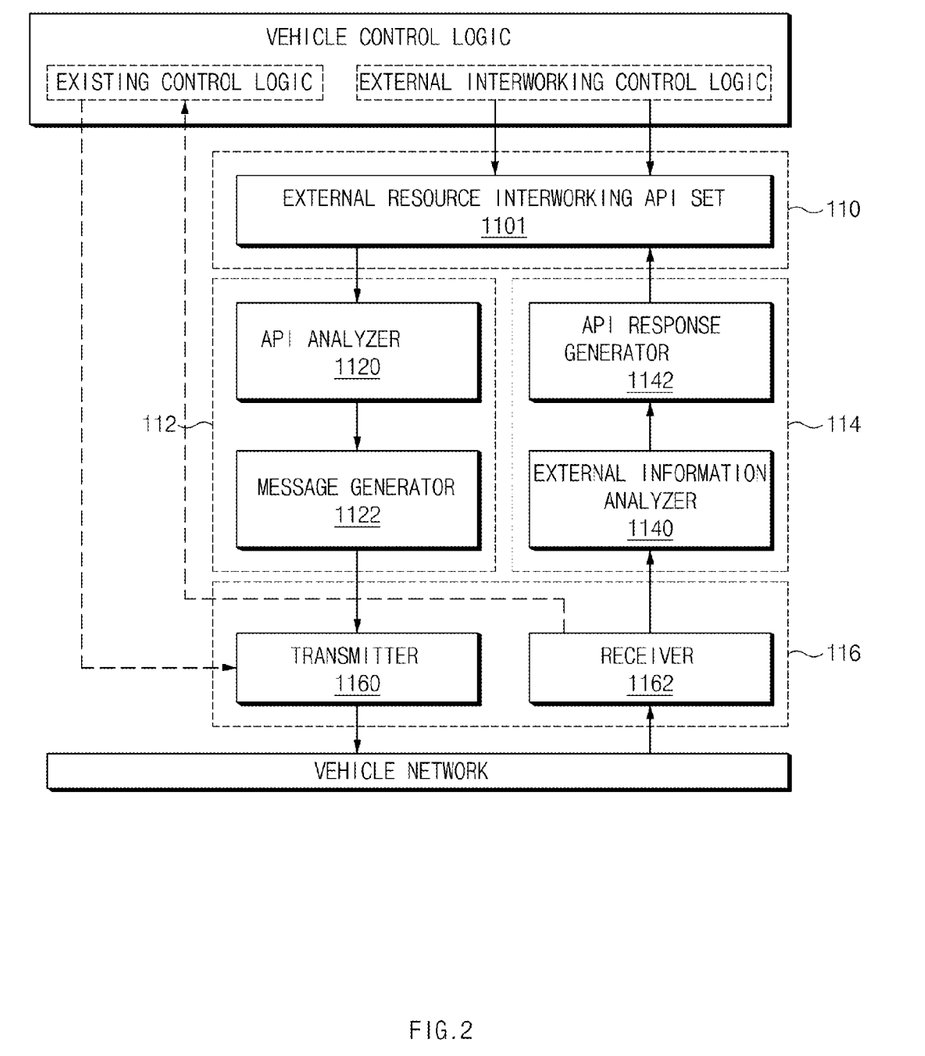
FIG. 2 is a block diagram illustrating a vehicle controller according to an embodiment of the present inventive concept
Figure 3:
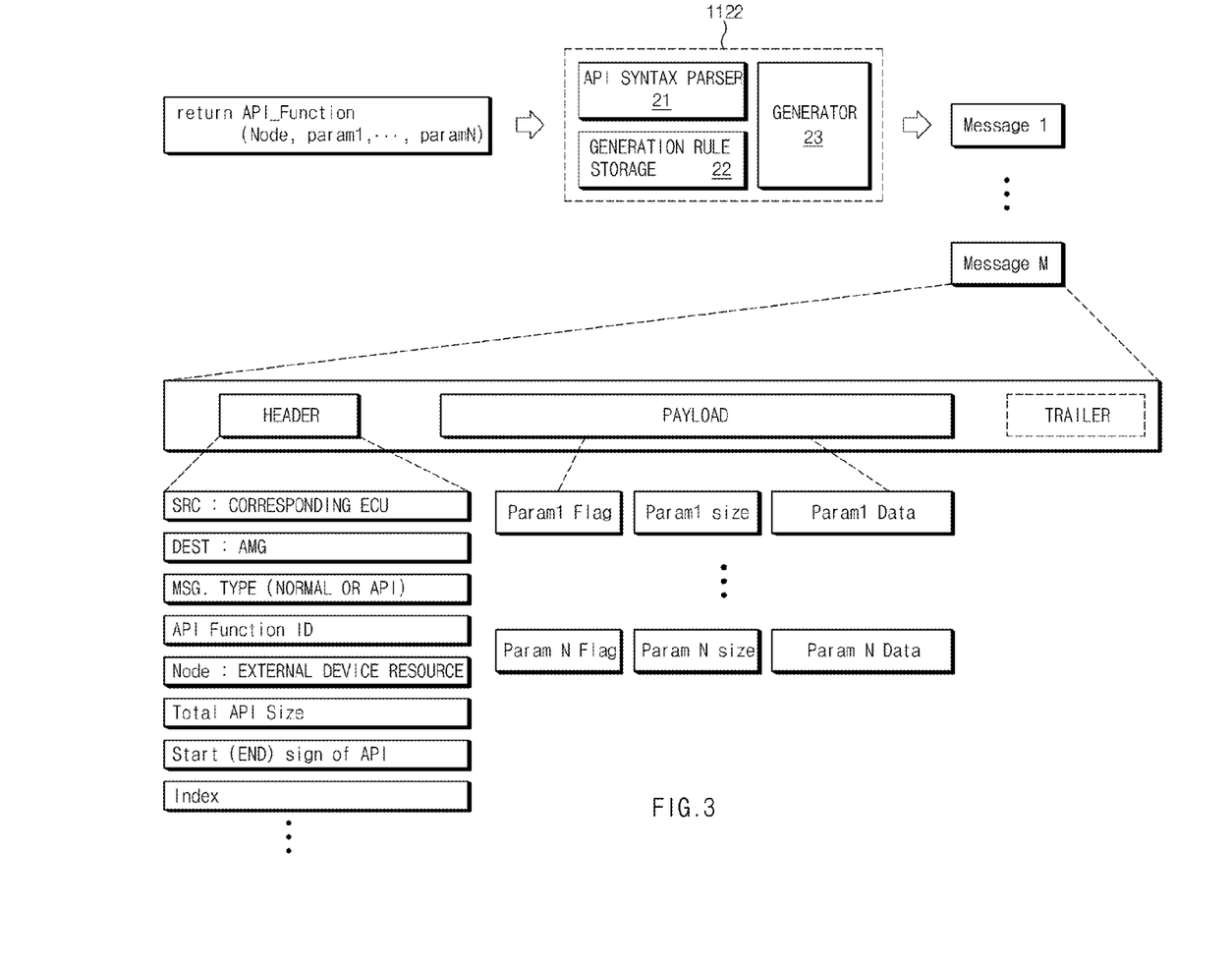
FIG. 3 is a diagram illustrating a configuration of a message generator shown in FIG. 2.
Figure 4:
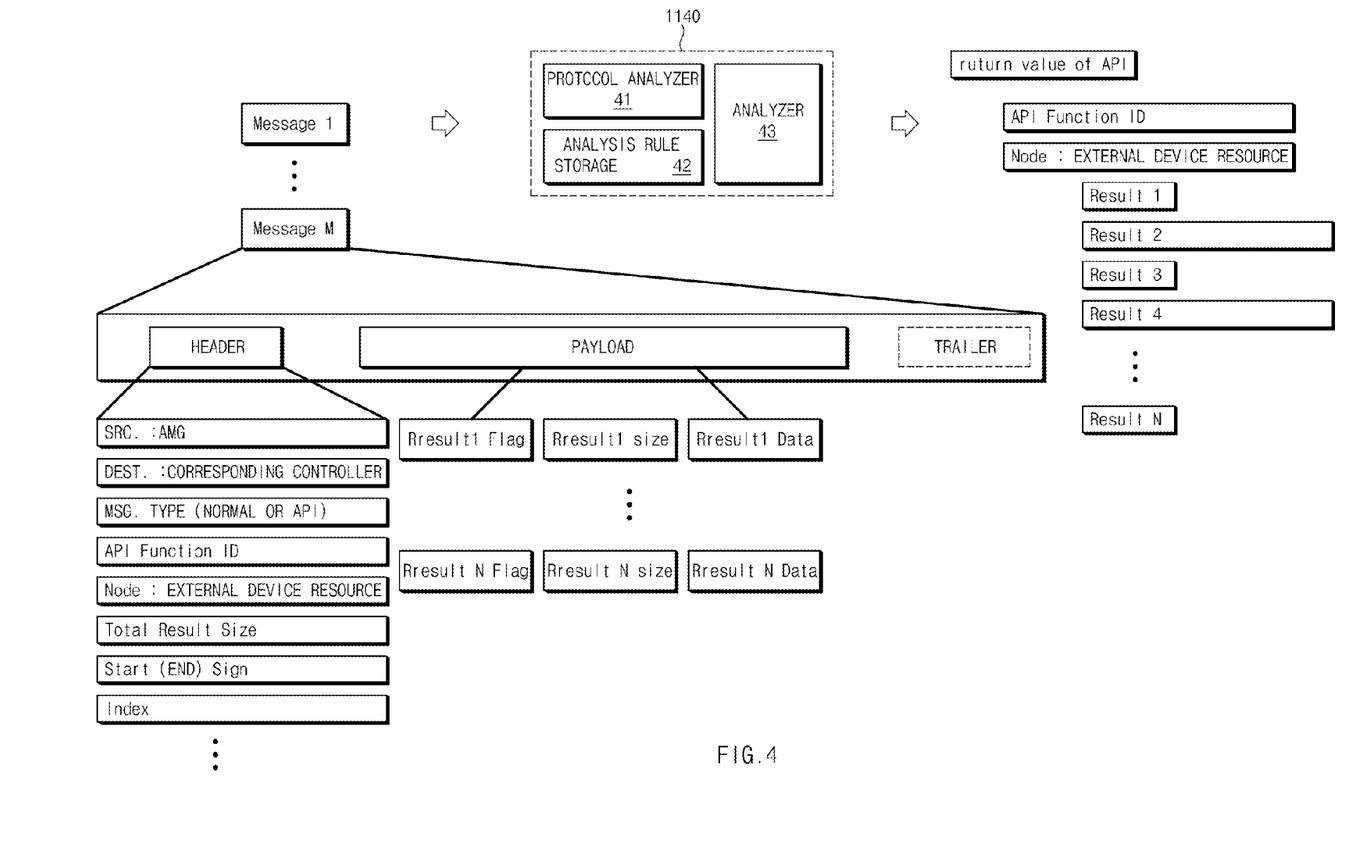
FIG. 4 is a diagram illustrating a configuration of an external information analyzer shown in FIG. 2.
Figure 5:
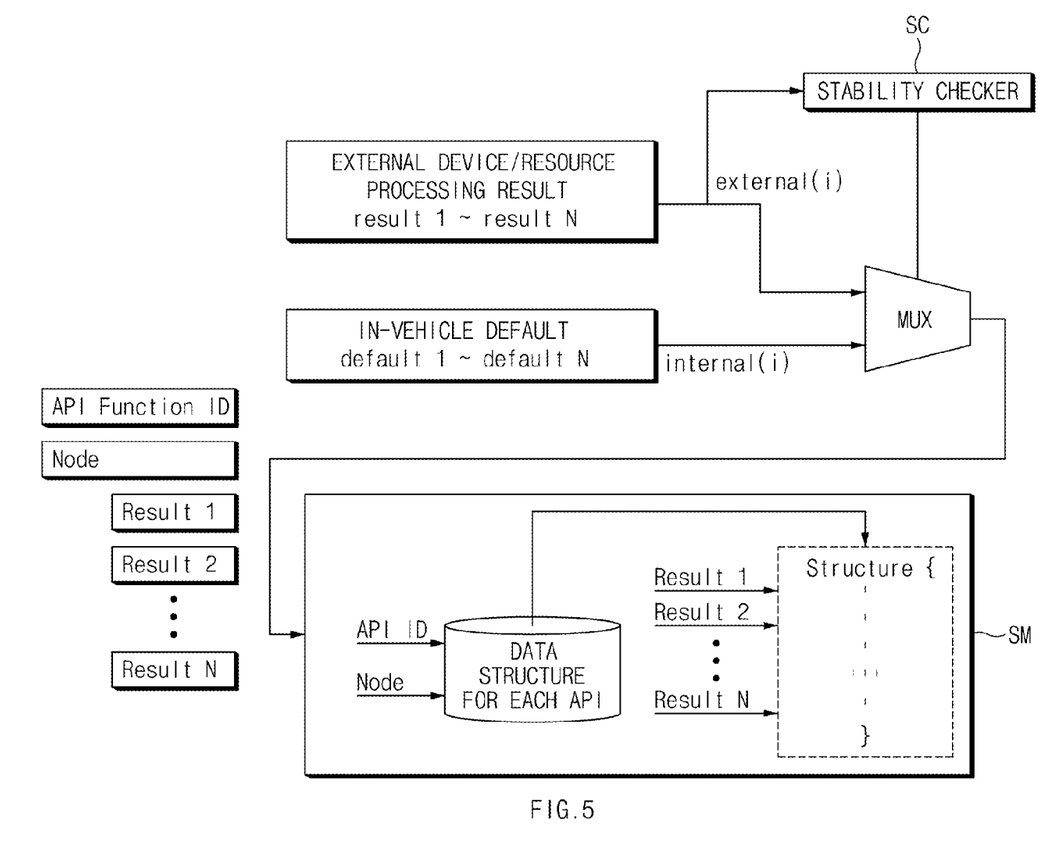
FIG. 5 is a diagram illustrating a configuration of an application program interface (API) response generator shown in FIG. 2.

FIG. 1 is a block diagram illustrating a system for interworking between a vehicle controller and an external resource according to an embodiment of the present inventive concept, FIG. 2 is a block diagram illustrating a vehicle controller of the present disclosure, FIG. 3 is a diagram illustrating a configuration of a message generator shown in FIG. 2, FIG. 4 is a diagram illustrating a configuration of an external information analyzer shown in FIG. 2, and FIG. 5 is a diagram illustrating a configuration of an API response generator shown in FIG. 2.

As shown in FIG. 1, the system for interworking between a vehicle controller and an external resource may include at least one vehicle controller 11 an automotive mobile gateway (AMG) 12, and at least one external device 13.

The vehicle controller 11 may be an electronic device that controls an engine of vehicle, a chassis, and electronics and comfort systems, and the like. The vehicle controller 11 may include an electronic control unit (ECU) that controls a battery, the engine, a transmission, a steering system, a suspension system, a brake system, or the like and a body control module (BCM) that controls an air conditioning system, a cluster, a digital dashboard, a wiper, light, a rear obstacle detection device, an anti-theft system, multiple communication, a door lock, a power window, a power seat, a seat belt, an air bag, or the like The vehicle controller 11 may store a control program in a memory (not shown), and control an element inside the vehicle through the control program.

The vehicle controller 11 may send and receive control information mutually by using an in-vehicle network to perform an operation. Here, the in-vehicle network (hereinafter, referred to as vehicle network) may use a Controller Area Network (CAN), a Media Oriented Systems Transport (MOST) network, a Local Interconnect Network (LIN), a X-by-Wire (Flexray), or the like.

The AMG 12 may serve as an interface that connects the vehicle controller 11 with the external device 13. The AMG 12 may be installed inside the vehicle together with the vehicle controller 11.

The AMG 12 may be connected to the vehicle controller 11 through the vehicle network, and may be connected to the external device 13 via an external network of the vehicle. Here, the external network of the vehicle may include a wireless Internet network such as a mobile communication network, Wi-Fi, and WiBro, a short range communication network such as Bluetooth, Radio Frequency Identification (RFID), and Near Field Communication (NFC), and a vehicle communication network such as Vehicle to Vehicle (V2V), Vehicle to Infrastructure (V2I), Vehicle to Device (V2D), and the like.

The AMG 12 may include an exterior interworking application program interface (API) processor 120 for requesting resource utilization of the external device 13 at the request of the vehicle controller 11. An exterior calculation result processor 122 for transmitting information obtained through the resource of the external device 13 to the vehicle controller 11. A second communicator 124 connects the external device 13 to the vehicle network, and a third communicator 126 connects the external device 13 to the external network of the vehicle.

The external device 13 may be an information technology (IT) device which provides the external resource. Here, the resource may include an infrastructure around the vehicle, a camera embedded in a portable device, a global positioning system (GPS), a gyroscope, various devices such as an accelerometer, and the like, and includes a function of a wearable device such as biometric recognition, healthcare, a condition determination, and the like.

Each element described above may configure a network layer by adding a base software layer to an upper layer of hardware in order to maintain a communication system used by an existing vehicle controller.

As shown in FIG. 1, the vehicle controller 11 may include an API generator 110, an API transmitter 112, an external information receiver 114, and a first communicator 116.

The API generator 110 may generate an API for performing basic interface functions which are used by existing vehicle control logic so as to utilize information provided by the resource (external resource) of the external device 13. The API generator 110 may store and manage the generated APIs as an external resource interworking API set 1101 (see FIG. 2).

The external resource interworking API set 1101 may be composed of a set of interface such as Table 1

TABLE 1

| Division of interface (API) | Main function |
|---|---|
| Device node open/close-based interface | Open or close external device recognizable in vehicle controller as communication node |
| Configuration setting based interface | Set internal/external configuration of vehicle to be suitable for transmission of requested/transmitted information |
| External device/resource environment information request(get) based interface | Request information on external interworking device and utilizable resource information |
| External device/resource environment setting request based interface | Vehicle controller sets configuration required for external interwork-able device and utilizable resource |
| Vehicle controller status transmission(set) based interface | Inform configuration and status of vehicle controller to external device |
| External device/resource processing result request(get) based interface | Request processing information of external device/resource required to vehicle controller operation |
| Vehicle control information transmission(set) based interface | Transmit control result information performed in vehicle controller to external device |

The vehicle controller 11 may call the API from the API generator 110 to use the external resource 13. The API calling sequence may vary according to the use of the external resource 13.

The API transmitter 112 may request for information (control required information) required for the vehicle control or to transmit vehicle data.

As shown in FIG. 2, the API transmitter 112 may include an API analyzer 1120 and a message generator 1122.

The API analyzer 1120 may analyze the content of the API called from the external resource interworking API set 1101 and may examine the validity and the consistency of the called API. The API call may generate at least one vehicle network message. However, in general, since a bandwidth of the vehicle network may be limited, when the vehicle controller 11 calls the API unnecessarily or calls a wrong API in a random pattern, the load of vehicle communication may increase unnecessarily, which leads to a waste of bandwidth. Therefore, in the present disclosure, the API analyzer 1120 may serve as a filter to prevent the bandwidth waste of the limited vehicle network.

The API analyzer 1120 may examine the validity of device node, communication environment compliance, and device capability, with respect to OPEN API. In addition, the API analyzer 1120 may examine the validity of device node with respect to CLOSE API, and may examine consistency of a data parameter range with respect to other API. When an error is detected based on the result of the examination, the API analyzer 1120 may return the error.

The message generator 1122 may generate a valid in-vehicle network message (vehicle network message) with respect to the API analyzed by the API analyzer 1120. In other words, the message generator 1122 may generate a vehicle network message (vehicle communication message) corresponding to the API which passed the examination of the validity and the consistency of the API analyzer 1120 among the called APIs.

The message generator 1122 may convert the API called for the communication between the vehicle controller 11 and the AMG 12 into the vehicle network message, and may be an element which is required for the external resource interworking technology to have compatibility with the operation environment (communication input/output interface, protocol) of the existing vehicle controller.

Referring to FIG. 3, the message generator 1122 may include an API syntax analyzer (parser) 21, a generation rule (schema) storage 22, and a generator 23.

The API syntax analyzer (parser) 21 may receive an API function to parse (analyze) syntax.

The generation rule (schema) storage 22 may be a rule for converting the API function into the vehicle network message.

The generator 23 may generate a vehicle network message from the syntax parsed by the API syntax analyzer (parser) 21 based on a generation rule. At this time, the generator 23 may generate at least one vehicle network message from a single API.

The vehicle network message may include a header field, a payload field, and a trailer field.

The header field may store information such as a source (SRC.), a destination (DEST.), a message type (normal or API), an API function ID, a node, a total API size, the start sign or end sign of the API, an index, and the like. The payload field may store information such as a parameter flag, a parameter size, parameter data, and the like. The trailer field may be used optionally.

The first communicator 116 may include a transmitter 1160 and a receiver 1162.

The transmitter 1160 may transmit a message generated by the message generator 1122 via an existing vehicle network. The receiver 1162 may receive a message transmitted from the AMG 12 via the vehicle network.

The external information receiver 114 may include an external information analyzer 1140 and an API response generator 1142.

The external information analyzer 1140 may analyze a message received through the receiver 1162 of the first communicator 116 and may extract the analysis result. The received message may include information (calculation result) which the vehicle controller 11 requested to the external resource 13.

The external information analyzer 1140 may include, as shown in FIG. 4, a protocol analyzer 41, an analysis rule storage 42, and an analyzer 43.

The protocol analyzer 41 may parse the message received from the AMG 12. This message may include the header field, the payload field, and the trailer field.

The header field may store information such as a source (SRC.), a destination (DEST.), a message type (normal or API), an API function ID, a node, a size of entire result (return value), the start sign or end sign, an index, and the like. The payload field may store information such as a result (return value) flag, a result size, result data, and the like. The trailer field may be used optionally.

The analysis rule storage 42 may store an analysis rule to analyze the received message.

The analyzer 43 may analyze the parsed message based on the analysis rule. The analyzer 43 may output, as the return value, the API function ID, the node, and the result data.

The API response generator 1142 may check the stability when applying a processing result outputted from the external information analyzer 1140 to the vehicle control. In other words, as shown in FIG. 5, the API response generator 1142 may check (data consistency check) whether a range and a type of the data provided from the external resource 13 are suitable for the vehicle control through a stability checker (SC).

When there is no irregularity in the stability based on the check result, the API response generator 1142 may generate an API response by using the data received from the external resource 13 and the in-vehicle data. In this case, the API response generator 1142 may generate an API response having the form of a structure through a structure maker (SM). The API response generator 1142 may return the generated API response to the vehicle controller 11.

Figure 6:
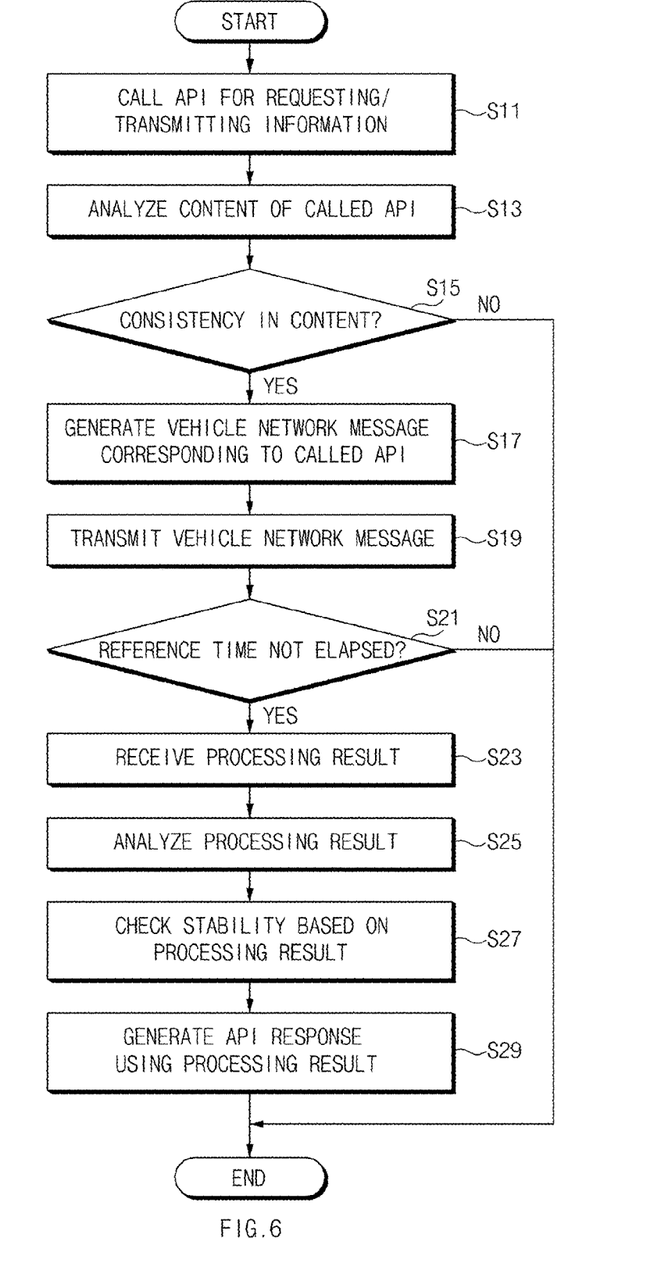
FIG. 6 is a flowchart illustrating a method for operating a vehicle controller according to an embodiment of the present inventive concept.

FIG. 6 is a flowchart illustrating a method for operating a vehicle controller according to an embodiment of the present inventive concept.

The vehicle controller 11 may call an API for requesting or transmitting information to the external device 13 (S11).

The vehicle controller 11 may analyze the content of the called API (S13).

The vehicle controller 11 may check whether there is a consistency in the analyzed content (S15).

When there is a consistency in the analyzed content, the vehicle controller 11 may generate a vehicle network message by using the called API (S17). That is, the vehicle controller 11 may perform a protocol conversion of the called API according to a protocol of the vehicle network.

The vehicle controller 11 may transmit the generated the vehicle network message to the AMG 12 via the vehicle network (S19).

The vehicle controller 11 may check whether a reference time has elapsed after transmitting the generated vehicle network message (S21).

The vehicle controller 11 may receive the processing result transmitted from the external device 13 in the reference time (S23).

The vehicle controller 11 may analyze the processing result received from the external device 13 (S25).

The vehicle controller 11 may check the stability when the analyzed processing result is applied to the vehicle control (S27).

The vehicle controller 11 may generate an API response by using the processing result when there is no problem in the stability based on the check result (S29). The vehicle controller 11 may perform the vehicle control according to the API response.

Figure 7:
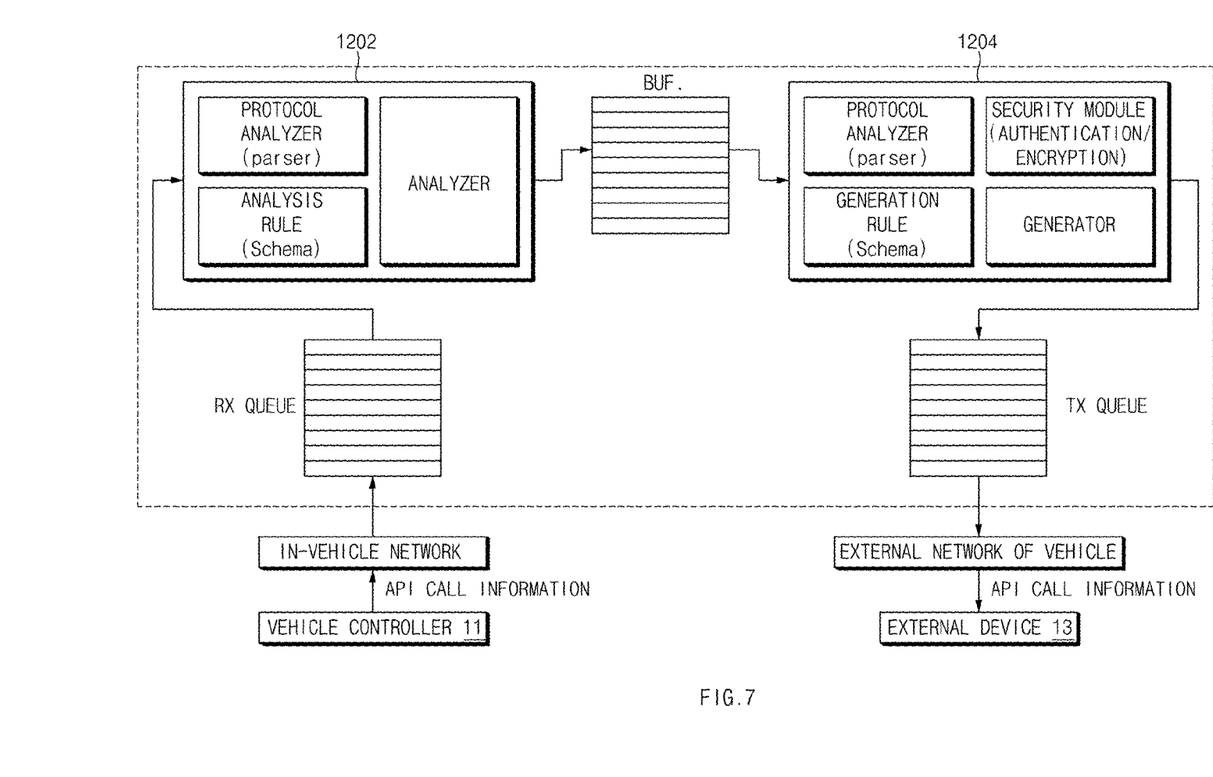
FIG. 7 is a configuration of an exterior interworking API processor of an automotive mobile gateway (AMG) shown in FIG. 1.
Figure 8:
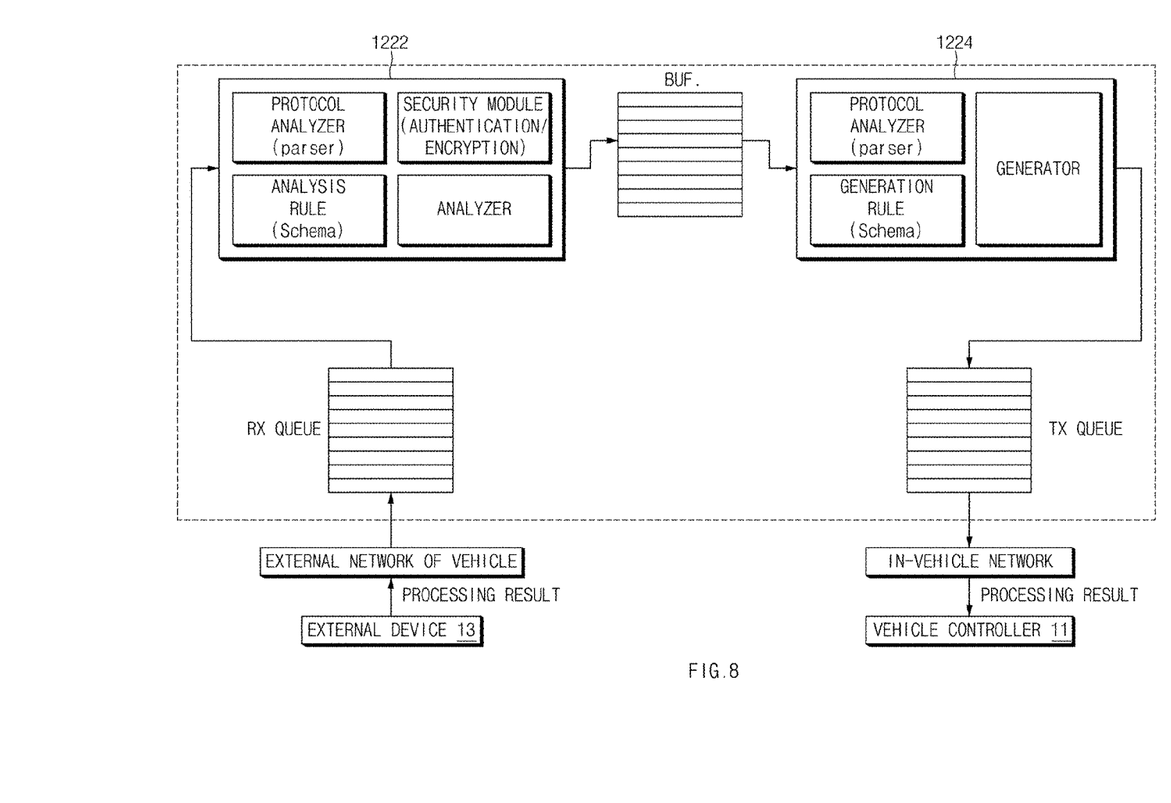
FIG. 8 is a configuration of an exterior calculation result processor of an AMG shown in FIG. 1.

FIG. 7 is a configuration of an exterior interworking API processor of an AMG shown in FIG. 1, and FIG. 8 is a configuration of an exterior calculation result processor of an AMG shown in FIG. 1.

Referring to FIG. 7, the AMG 12 may exchange information between heterogeneous networks with each other. Thus, the vehicle controller 11 may send and receive information with the external device 13 via the AMG 12 without changing hardware. Since a plurality of vehicle controllers 11 and a plurality of external devices 13 may exist together, the AMG 12 may support many-to-many two-way communication.

The AMG 12 may transmit an information request of the vehicle controller 11 to the external device 13 in real time, and may transmit the information provided from the external device 13 to the vehicle controller 11 in real time.

The AMG 12 may include the exterior interworking API processor 120 and the exterior calculation result processor 122. The AMG 12 may be installed inside the vehicle controller 11 in the form of software.

The exterior interworking API processor 120 may transmit the API call generated by the vehicle controller 11 to the external device 13. The exterior interworking API processor 120 may perform a protocol conversion from the in-vehicle network message to a vehicle exterior network message.

As shown in FIG. 1, the exterior interworking API processor 120 may include an API input 1200, an API processor 1202, an API output generator 1204, an API output 1206, and a buffer.

The API input 1200 may receive API request information transmitted from the vehicle controller 11 via the in-vehicle network. The API input 1200 may receive the API request information received via the second communicator 124 as an input. The API input 1200 may be implemented in a reception queue (RX Queue).

The API processor 1202 may perform a protocol conversion for the in-vehicle network message received via the API input 1200 through a parser, and an analyzer may analyze the converted message according to the analysis rule.

The API output generator 1204 may include a protocol analyzer for analyzing the protocol of the external network of the vehicle, a security module for accomplishing authentication and encryption so as to secure message, and a generator for generating the vehicle exterior network message. The API output generation unit 1204 may convert the in-vehicle network message into a message for transmitting via the external network of the vehicle.

The API output 1206 may transmit the message which is output from the API output generator 1204 via the external network of the vehicle. In this case, the API output 1206 may be implemented in a transmission queue (TX Queue).

The fourth communicator 126 may transmit a message which is sent via the API output 1206 to the external device 13 through the external network of the vehicle.

The exterior interworking API processor 120 may include a buffer which is implemented by a shared memory, a dual-port memory, or a buffer for a high-speed serial communication.

Referring to FIG. 8, the exterior calculation result processor 122 may send again the calculation/processing result of the external resource 13 for the API call of the vehicle controller 11 to the vehicle controller 11. The exterior calculation result processor 122 may convert the vehicle exterior network message into the in-vehicle network message.

The exterior calculation result processor 122 may include, as shown in FIG. 1, a result input 1220, a result processor 1222, a result output generator 1224, a result output 1226, and a buffer.

The result input 1220 may receive an input of a message received through the third communicator 126. The result input 1220 may be implemented by a reception queue (RX QUEUE).

The result processor 1222 may include a protocol analyzer for analyzing the protocol of a message received through the external network of the vehicle, an analysis rule (schema), a security module for accomplishing authentication and decryption for the reception message, and an analyzer for analyzing the reception message based on the analysis rule.

The result output generator 1224 may include a protocol analyzer for analyzing the protocol of the in-vehicle network, a generation rule (schema), and a generator which generates (converts into) an in-vehicle network message from a reception message according to the generation rule (schema).

The result output 1226 may transmit the message generated by the result output generator 1224 to the vehicle controller 11 via the in-vehicle network. The result output 1226 may implemented by a transmission queue (TX QUEUE).

Figure 9:
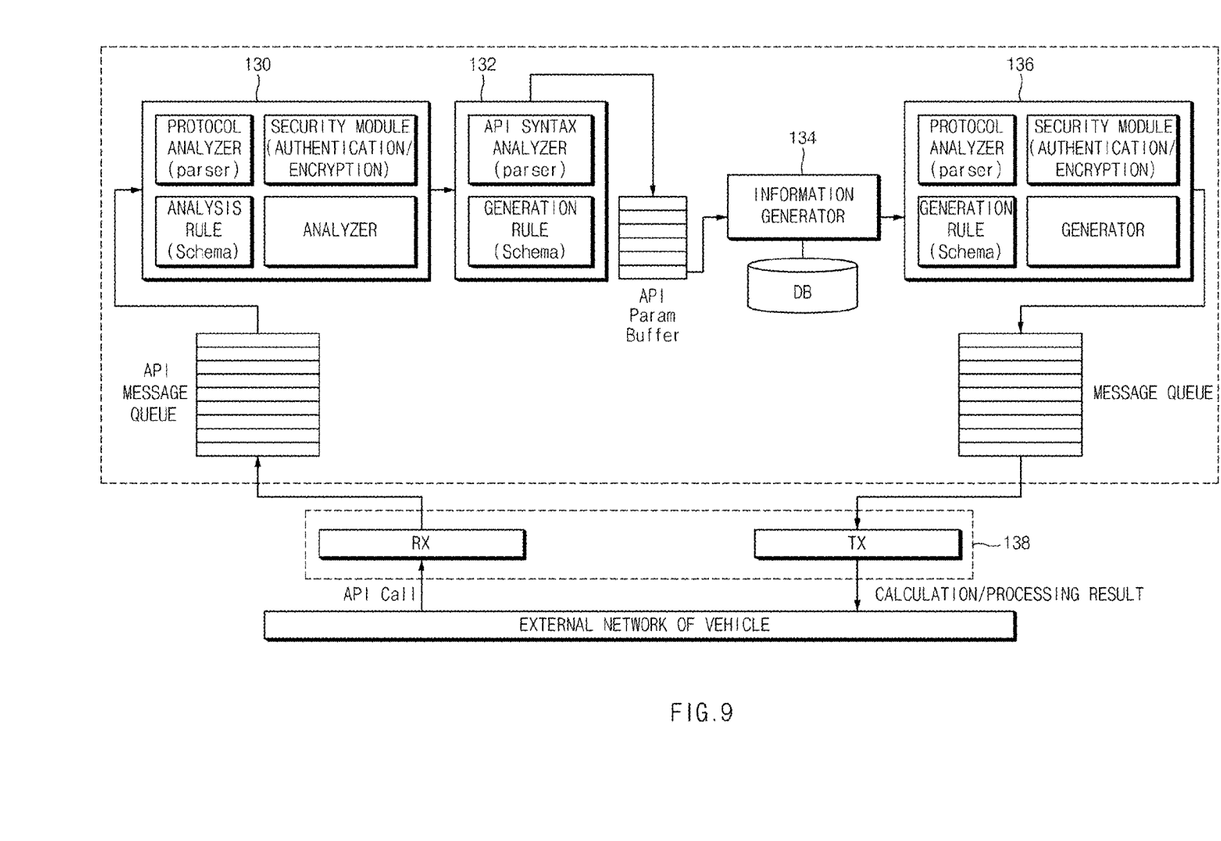
FIG. 9 is a diagram illustrating a configuration of an external device shown in FIG. 1.

FIG. 9 is a diagram illustrating a configuration of an external device shown in FIG. 1.

As described above, the external device 13 may collect information from various sensors when receiving a request for information necessary for the vehicle control from the vehicle controller 11, and compute the collected information to return the calculation result to the vehicle controller 11.

For example, the external device 13 may be various types of smart/wearable devices that can perform calculation processing of high performance which is difficult to process in the vehicle, that are equipped with various sensors which are difficult to mount in the vehicle, or may be an external IT environment itself connected to the vehicle.

The external device 13, as shown in FIG. 9, may include an API receiver 130, an API analyzer 132, an result generator 134, a result transmitter 136, and a fourth communicator 138.

The API receiver 130 may receive the vehicle exterior network message received via the fourth communicator 138.

The API receiver 130 may parse the vehicle exterior network message, and may accomplish an authentication and decryption. Then, the API receiver 130 may analyze the vehicle exterior network message according to the analysis rule.

The API analyzer 132 may check the request of the vehicle controller 11 by analyzing the API syntax on the basis of the generation rule.

The result generator 134 may generate information at the request of the vehicle controller 11. The result transmitter 136 may convert the information generated by the result generator 134 into the vehicle exterior network message.

In a case of a wearable device or a smart phone, since the external device 13 is able to accumulate and process all of the previous conditions before a driver gets on the vehicle, it is possible to utilize accumulated history information by preparing a database (DB) within the external device 13. Then, the external device 13 is equipped with a communication module and a security module having a level equivalent to that of the AMG 12 in order to send and receive data with the AMG 12 via the external network of the vehicle.

Figure 10:
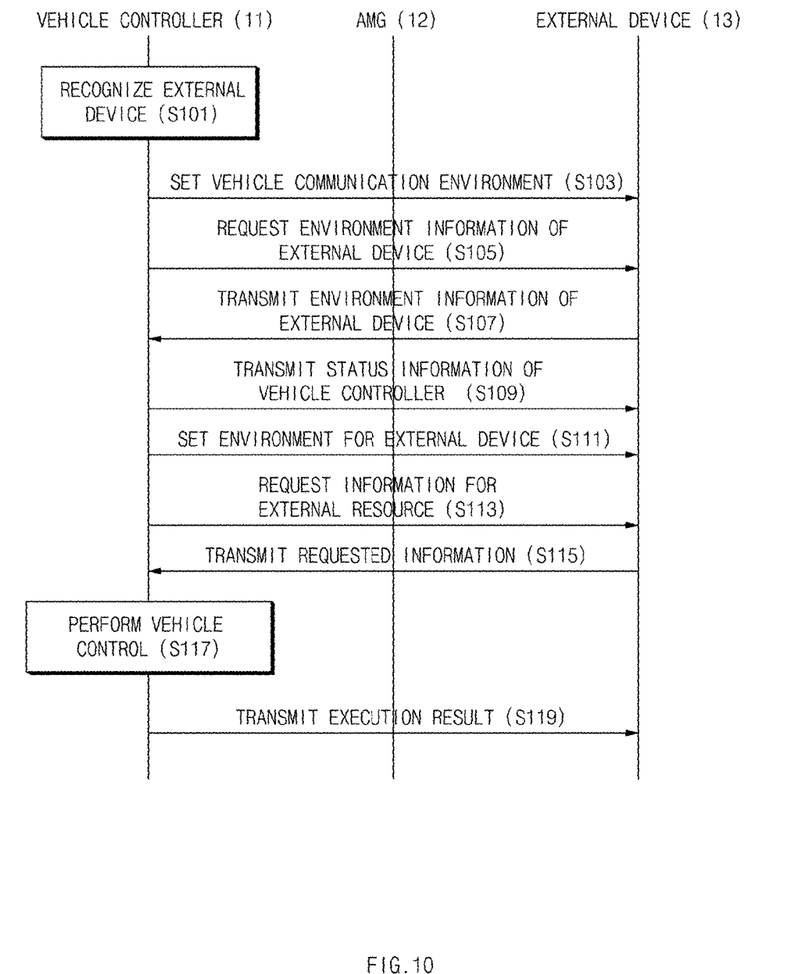
FIG. 10 is a flowchart illustrating a method for interworking between a vehicle controller and an external resource according to an embodiment of the present inventive concept.

FIG. 10 is a flowchart illustrating a method for interworking between a vehicle controller and an external resource according to an embodiment of the present inventive concept.

First, the vehicle controller 11 may generate a communication node from the recognizable external device 13, and set a vehicle communication environment with the external device 13 (S101, S103). At this time, the vehicle controller 11 and the AMG 12 may set the in-vehicle network, and the AMG 12 and the external device 13 may set an external network of the vehicle. The AMG 12 may convert the message transmitted from the vehicle controller into the vehicle exterior network message to transmit to the external device 13, and convert the message transmitted from the external device 13 into the in-vehicle network message to transmit to the vehicle controller 11.

The vehicle controller 11 may request environment information of the external device 13 (S105). Here, the environment information may include information on the external device 13 which can interwork with the vehicle controller 11 among at least one external device 13 and information on resource which is available in the external device 13.

The external device 13 may transmit the environment information of the external device 13 upon request of the vehicle controller 11 (S107).

The vehicle controller 11 may transmit status information of the vehicle controller 11 upon request of the external device 13 (S109).

The vehicle controller 11 may set an environment (configuration) necessary for the external device 13 which can interwork with the vehicle controller 11 and available resource based on the environment information of the external device 13 (S111).

The vehicle controller 11 may request information required for the vehicle control to the external device 13 (S113).

The external device 13 may transmit the information obtained from external resources according to the request of the vehicle controller 11 to the vehicle controller 11 (S115).

The vehicle controller 11 may perform the vehicle control by using the information provided from the external device 13 and may transmit the execution result to the external device 13 (S117, S119).

As described above, since the present disclosure provides an interface that can utilize resources of an external device necessary for a vehicle control, the vehicle controller can improve the control performance of a vehicle by utilizing the external resources.

Further, according to the present disclosure, since additional hardware is not added, a new IT function can be utilized without cost increase and weight increase.

Further, limitations of mounting a device in a vehicle may be overcome.

Further, it is possible to easily utilize the newest IT technology for the vehicle control.

Although the exemplary embodiments of the present inventive concept have been described in detail hereinabove, it should be clearly understood that many variations and modifications of the basic inventive concepts herein taught which may appear to those skilled in the present art will still fall within the spirit and scope of the present disclosure, as defined in the appended claims.

What is claimed is:

1. A system for interworking between a vehicle controller and an external resource, the system comprising:
   at least one vehicle controller mounted in a vehicle and configured to control an operation of the vehicle;
   at least one external device providing processing information of the external resource upon a request from the vehicle controller; and
   an automotive mobile gateway (AMG) connected to the vehicle controller via an in-vehicle network and connected to the external device via an external network of the vehicle to interface, so that the vehicle controller and the external device communicate with each other,
   wherein the vehicle controller controls the operation of the vehicle based on information obtained by the external resource in the external device.

2. The system of claim 1, wherein the vehicle controller comprises:
   an application program interface (API) generator having an API set and configured to utilize the processing information provided by the external device in a vehicle control;
   an API transmitter configured to request information necessary for the vehicle control or to transmit vehicle data according to an API called from the API set;
   an external information receiver configured to return the processing information of the external device included in a message received via the in-vehicle network to the vehicle controller; and
   a first communicator configured to connect the vehicle controller to the in-vehicle network.

3. The system of claim 2, wherein the API transmitter comprises:
   an API analyzer configured to examine validity and consistency of the called API; and
   a message generator configured to generate an in-vehicle network message corresponding to the API which passed the examination of the validity and the consistency.

4. The system of claim 3, wherein the message generator is configured to generate at least one in-vehicle network message with respect to a single API.

5. The system of claim 3, wherein the message generator is configured to analyze syntax of the API which passed the examination and configured to generate the in-vehicle network message from the analyzed API based on a generation rule.

6. The system of claim 5, wherein the in-vehicle network message comprises a header field, a payload field, and a trailer field.

7. The system of claim 6, wherein the header field comprises a source, a destination, a message type, an API function ID, a node, a total API size, a start sign or end sign of the API, and an index.

8. The system of claim 6, wherein the payload field comprises a parameter flag, a parameter size, and parameter data.

9. The system of claim 2, wherein the external information receiver comprises:
   an external information analyzer configured to analyze a message received through the first communicator and extracts the processing information of the external device; and
   an API response generator configured to check stability in case of applying the processing information extracted from the external information analyzer and configured to generate an API response based on a result of checking.

10. The system of claim 9, wherein the API response generator is configured to generate the API response by using the processing information of the external device and an in-vehicle data, when there is no irregularity in the stability.

11. The system of claim 1, wherein the AMG comprises:
    an exterior interworking API processor configured to perform a protocol conversion from an in-vehicle network message to a vehicle exterior network message; and
    an exterior calculation result processor configured to convert the vehicle exterior network message into the in-vehicle network message.

12. The system of claim 1, wherein the external device is an information communication device that provides the external resource.

13. The system of claim 12, wherein the external resource comprises an infrastructure around the vehicle, a camera embedded in a portable device, a global positioning system (GPS), a gyroscope, and an accelerometer, and includes biometric recognition function, healthcare function, and a condition determination function of a wearable device.

14. The system of claim 12, wherein the external device comprises a database (DB) which accumulates and manages information on a condition of a driver before the driver enters the vehicle.

15. A method for interworking between a vehicle controller and an external resource, the method comprising:
    requesting, by a vehicle controller, the use of an external resource of an external device through an automotive mobile gateway (AMG);
    sending, by the AMG, the request of the vehicle controller to the external device; and
    transmitting, by the external device, processing information according to the request of the vehicle controller to the vehicle controller through the AMG,
    wherein the vehicle controller controls the operation of the vehicle based on information obtained by the external resource in the external device.

16. The method of claim 15, further comprising, prior to the step of requesting:
    generating, by the vehicle controller, a communication node from the external device; and
    setting a vehicle communication environment with the external device.

17. The method of claim 15, wherein the step of requesting includes requesting environment information and information required for the vehicle control.

18. The method of claim 15, wherein the step of sending includes sending environment information of the external device and status information of the vehicle controller.

19. The method of claim 15, wherein the step of transmitting includes transmitting the processing information obtained from the external resource according to the request of the vehicle controller to the vehicle controller and transmitting the execution result to the external device.

20. The method of claim 15, further comprising:
  setting, by the vehicle controller, an environment necessary for the external device which interworks with the vehicle controller and the external resource based on the environment necessary for the external device.

\* \* \* \* \*